US008453113B2

(12) United States Patent
Kueng

(10) Patent No.: US 8,453,113 B2
(45) Date of Patent: May 28, 2013

(54) CONFIGURATION TOOL AND SYSTEM FOR AN INTELLIGENT ELECTRONIC DEVICE

(75) Inventor: Thomas Kueng, Nussbaumen (CH)

(73) Assignee: ABB Technology AG, Zurich (CH)

(*) Notice: Subject to any disclaimer, the term of this patent is extended or adjusted under 35 U.S.C. 154(b) by 453 days.

(21) Appl. No.: 12/721,302

(22) Filed: Mar. 10, 2010

(65) Prior Publication Data

US 2010/0223033 A1    Sep. 2, 2010

Related U.S. Application Data

(63) Continuation of application No. PCT/IB2007/053636, filed on Sep. 10, 2007.

(51) Int. Cl.
*G06F 9/44*    (2006.01)
*G06F 9/45*    (2006.01)

(52) U.S. Cl.
USPC .......................... 717/113; 717/121; 706/45

(58) Field of Classification Search
USPC ............. 717/105, 109, 113–114, 120–121; 706/45–46
See application file for complete search history.

(56) References Cited

U.S. PATENT DOCUMENTS

| | | | |
|---|---|---|---|
| 5,966,532 A * | 10/1999 | McDonald et al. ............ | 717/105 |
| 6,067,538 A * | 5/2000 | Zorba et al. ...................... | 706/47 |
| 6,675,371 B1 * | 1/2004 | York et al. ...................... | 717/114 |
| 7,461,040 B1 * | 12/2008 | Goldman et al. .............. | 706/45 |
| 7,478,337 B2 * | 1/2009 | Kodosky et al. .............. | 715/771 |
| 7,490,314 B2 * | 2/2009 | Yuknewicz et al. ........... | 717/105 |
| 7,584,161 B2 * | 9/2009 | Forbes et al. .................... | 706/46 |
| 7,650,589 B2 * | 1/2010 | Cifra .............................. | 717/105 |
| 7,703,073 B2 * | 4/2010 | Illowsky et al. ............... | 717/121 |
| 7,707,549 B2 * | 4/2010 | Chudukatil et al. ........... | 717/120 |
| 7,716,150 B2 * | 5/2010 | Cheng et al. ..................... | 706/45 |
| 7,971,187 B2 * | 6/2011 | Sanghvi et al. ............... | 717/121 |
| 7,979,368 B2 * | 7/2011 | Kapoor et al. ................... | 706/20 |
| 7,987,445 B2 * | 7/2011 | Fuller et al. .................... | 717/105 |
| 8,028,241 B2 * | 9/2011 | Kodosky et al. .............. | 715/763 |
| 8,108,784 B2 * | 1/2012 | Hayles et al. ................. | 715/763 |
| 8,135,657 B2 * | 3/2012 | Kapoor et al. ................... | 706/45 |
| 8,151,244 B2 * | 4/2012 | Hsu et al. ....................... | 717/113 |
| 8,214,797 B2 * | 7/2012 | Cote et al. ...................... | 717/109 |
| 2007/0168161 A1 | 7/2007 | Vellore et al. | |

OTHER PUBLICATIONS

Wang et al, "A self adaptive mechanism for software configuration based on case based reasoning and policy", IEEE, pp. 250-255, 2010.*

Hu et al, "Multi agent system based autonomic computing environment", IEEE, pp. 105-110, 2004.*

(Continued)

*Primary Examiner* — Anil Khatri
(74) *Attorney, Agent, or Firm* — Buchanan Ingersoll & Rooney PC

(57) ABSTRACT

The present disclosure provides a computing device being configured to execute a configuration software tool for providing a plurality of function blocks and connections between function blocks in a visual representation of configuration data of an intelligent electronic device, wherein each function block is for executing a function in the intelligent electronic device. The configuration tool comprises computer-executable instructions for retrieving hardware configuration data relating to external variables created by second configuration software, and for causing the computer to generate a visual representation having the plurality of function blocks and said hardware configuration data. The present disclosure also provides a configuration system of an intelligent electronic device for power transmission and distribution.

9 Claims, 9 Drawing Sheets

OTHER PUBLICATIONS

Acampora et al, "Interoperable and adaptive fuzzy services for ambient intelligence applications", ACM Trans. on Autonomous and Adaptive Systems, vol. 5, No. 2, article 8, pp. 1-26, 2010.*

Theocharides et al, "Hardware enabled dynamic resources allocation for manycore systems using bidding based system feedback", EURASIP Journal on Embedded Systems, article 261434, pp. 1-21, 2010.*

International Search Report (PCT/ISA/210) for PCT/IB2007/053636 mailed Mar. 10, 2009.

Written Opinion (PCT/ISA/237) for PCT//IB2007/053636 mailed Mar. 10, 2009.

International Search Report (PCT/ISA/210) for PCT/IB2007/053635 mailed Aug. 22, 2008.

Written Opinion (PCT/ISA/237) for PCT/IB2007/053635 mailed Aug. 22, 2008.

"DIGSI 4, One Software for all SIPROTEC Protection Relays", SIEMENS, DIGSI4 Catalog SIP 2006, Jan. 1, 2006, pp. 3-8.

B. Duncan et al., "Applications and Advantages for Protection Schemes Using IEC 61850 Standard", Power Systems Conference: Advanced Metering, Protection, Control, Communication, and Distributed Resources, 2006, PS '06, IEEE, Mar. 1, 2006, pp. 63-72.

Saman Hadiani, "Design and Implementation of a Function Block Configuration Tool," Apr. 23, 2004, 52 pages.

A. Fay et al., "Design and Implementation of Java-Based Industrial Control System Configuration Tool," Emerging Technologies and Factory Automation, 2001, Proceedings, 2001 8th IEEE International Conference on Oct. 15-18, 2001, Piscataway, NJ, USA, IEEE, vol. 2, Oct. 15, 2001, pp. 553-558.

* cited by examiner

CONFIGURATION TOOL AND SYSTEM FOR AN INTELLIGENT ELECTRONIC DEVICE

RELATED APPLICATIONS

This application claims priority as a continuation application under 35 U.S.C. §120 to PCT/IB2007/053636 filed as an International Application on Sep. 10, 2007 designating the U.S., the entire content of which is hereby incorporated by reference in its entirety.

FIELD

The present disclosure relates to a system configuration, and more particularly, to a configuration system of an intelligent electronic device (IED) for power transmission and distribution.

BACKGROUND INFORMATION

An object of configuring an IED is to make and modify a complete configuration from the input of the device to the output of the device. An IED is a control and protection device for power transmission and distribution, such as a protective relay. A configuring process begins with determining the hardware (HW) configuration by selecting hardware components from a provided list. Known HW configuration tools are, for example, CAP 501/505/531 tools by ABB Technology AG.

FIG. 1 illustrates a prior art system for configuring an intelligent electronic device. The user of the system starts the configuration of an IED with an HW configuration tool and selects the required components which are to be used in an IED housing. The housing has a specific layout and is a container of hardware modules 102. The housing must be populated with hardware modules 102 according to the rules provided by the selected housing type. This results in a certain HW configuration whose operation is modified with other configuration tools such as an application configuration tool (ACT) 10 and a signal matrix tool 20 (SMT).

The ACT 10 is a graphical configuration tool providing an IED application by using function blocks 104. The ACT 10 has the advantage of visualizing and documenting the functionality of the device, but has the disadvantage of connecting and disconnecting inputs during testing and commissioning and reconnecting them to the same place. This is because the connections between the function blocks 102 and the actual hardware modules 104 are not provided. A connection to the hardware modules 104 is provided by a cross-reference list, which uses interface variables to connect signals between the hardware modules 102 and the function blocks 104.

The SMT 20 is a table-based configuration tool. The purpose of the SMT 20 is to handle signals of inputs and outputs toward the function blocks 104 and between the function blocks 104 on a matrix-based principle. This table-based configuration tool allows the user to use predefined logical functions (such as AND, OR) for the signals. A disadvantage of the table-based configuration tool is the difficulty of visualizing the configuration of the device on a SMT display, because the table of the SMT 20 is actually provided by a cross-reference list using interface variables to connect signals between the function blocks 102 and the actual inputs and outputs of the hardware modules 104. An advantage of SMT 20 is that it allows the user to connect and disconnect the signal and trip the output signal during testing and commissioning.

One disadvantage associated with the above system is that the ACT 10 cannot be effectively used as an on-line testing tool.

Another disadvantage associated with the above system is that the user has to choose which configuration tool he/she is going to use during the configuration of the IED. The configuration tool has to be closed when the user wishes to use another configuration tool.

One disadvantage of the current configuring systems is that the user has to start the configuration process from the beginning of the configuration process if there is a need to change the HW configuration and, as a result, the configurations made by other configuring tools is lost.

SUMMARY

An exemplary embodiment provides a computer-readable storage medium having a configuration software tool comprised of computer-executable instructions stored thereon to cause a computing device to provide a plurality of function blocks and connections between function blocks in a visual representation of configuration data of an intelligent electronic device. Each function block is for executing a function in the intelligent electronic device. The configuration software tool causing the computing device to perform operations comprising: a) retrieving hardware configuration data relating to external variables created by a second configuration software tool, and b) causing the computing device to generate a visual representation having said plurality of function blocks and said hardware configuration data.

An exemplary embodiment provides a configuration system of an intelligent electronic device for power transmission and distribution. The exemplary configuration system comprises at least one computing device having a processor configured to execute at least one of a first configuration software tool to provide a first visual representation of configuration data of the intelligent electronic device, and a second configuration software tool to provide a second visual representation of configuration data of the intelligent electronic device. The exemplary configuration system also comprises a configuration data storage device configured to store the configuration data, and a configuration data server configured to provide the configuration data to the configuration software tools. The configuration data server is configured to a) receive and forward a change in the configuration data made by the first configuration software tool, and to b) send a notification to the second configuration software tool to update the second visual representation, and vice versa to enable modifications to the configuration data by either one of the configuration software tools.

BRIEF DESCRIPTION OF THE DRAWINGS

In the following the disclosure will be described in greater detail by means of exemplary embodiments with reference to the accompanying drawings, in which.

DETAILED DESCRIPTION

Exemplary embodiments of the present disclosure to provide a configuration system that alleviates the above-described disadvantages.

Exemplary embodiments of the present disclosure provide an advantageous technique in which all configuration data from the input of the device to the output of the device is made available for different tools by data storage and a configuration data server. Different configuration tools can also be used coexistent. This is achieved by updating the configuration data with a configuration data server administering the data in different configuring tools so that everything that is configured in one configuration tool will be automatically updated in the other configuring tools. Therefore, there is no need for a cross-reference list using interface variables, because different configuration tools use and modify the same configuration data, that is updated in other tools.

An advantage of the present disclosure to the user is that the application configuration tool (ACT) can be even used as an on-line testing tool, because the signal flow from the input of the device to the output of the device is retrieved and arranged visibly and modifiably.

Another advantage of the present disclosure to the user is that the application configuration tool (ACT) and the signal matrix tool (SMT) or other configuring tools can be viewed and used concurrently.

Figure 1:
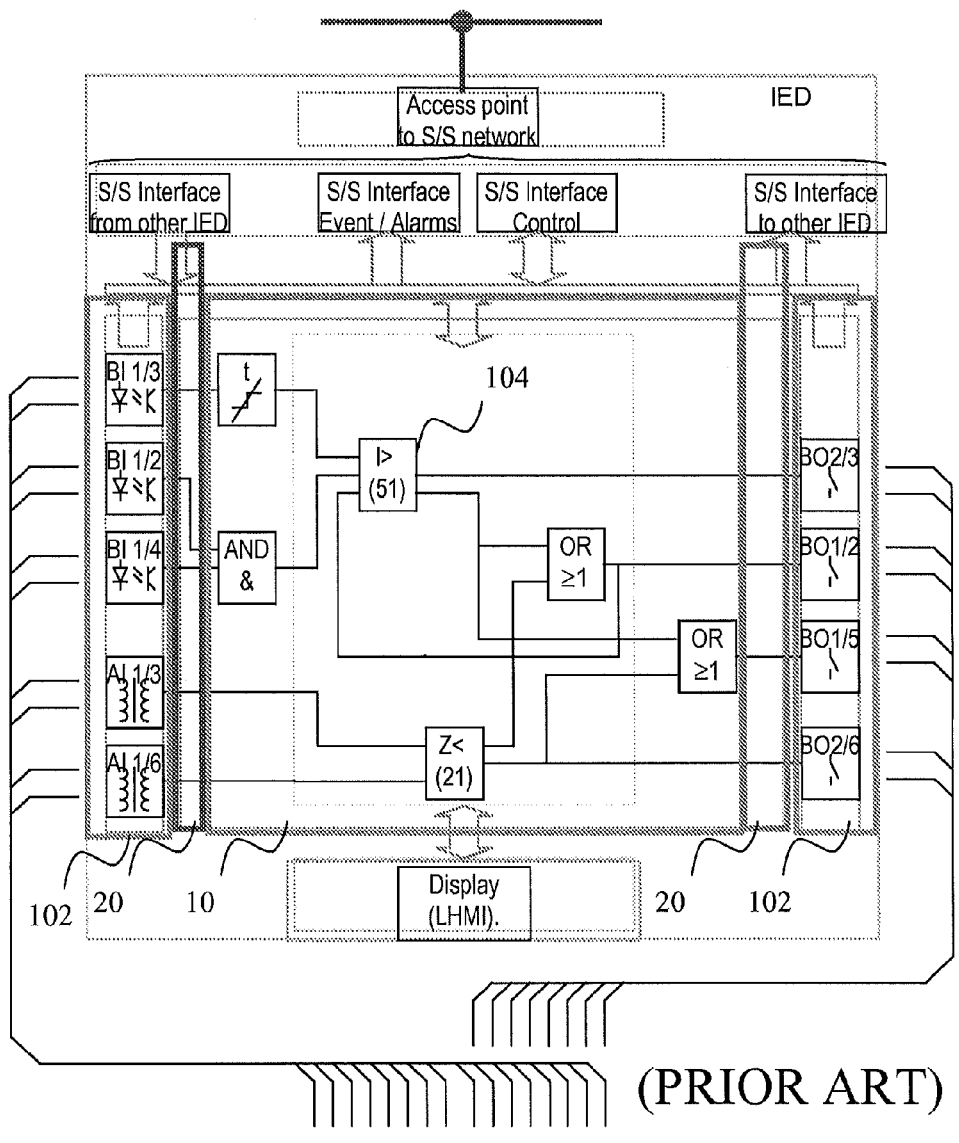
FIG. 1 is a diagram illustrating a known configuration system of an intelligent electronic device for power transmission and distribution.
Figure 2:
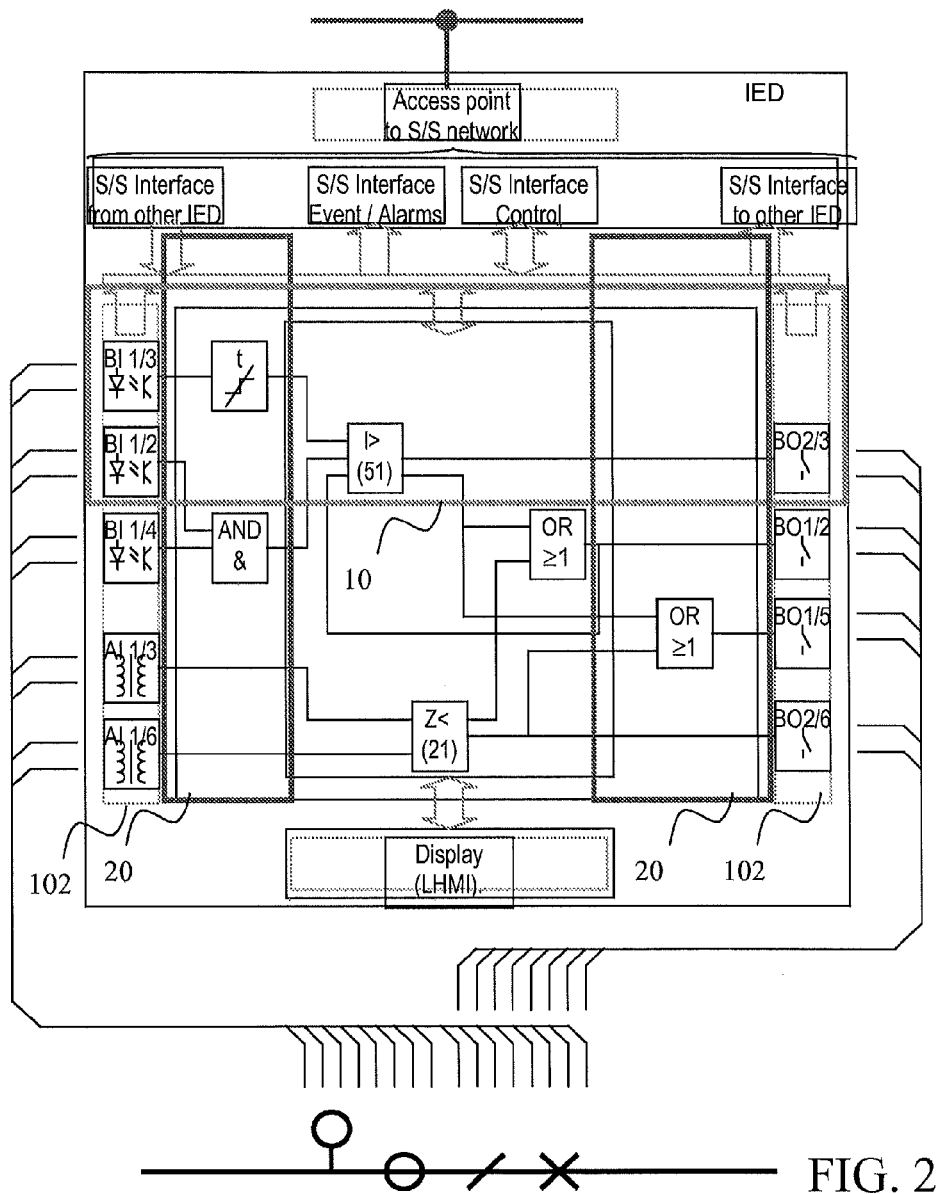
FIG. 2 is a diagram illustrating an exemplary configuration system according to an embodiment of the present disclosure.

FIG. 2 illustrates an exemplary system for configuring an IED according to at least one embodiment. As illustrated in FIG. 2, the signal flow from the input of the device to the output of the device is visible in the application configuration tool (ACT) 10. All connections between any element is therefore modifiable from the ACT 10. This is because the configuration data is made available to all tools and all changes made by any tool will be updated in all tools. The amount of information shown by different tools is controlled by the configuration data server for clarity reasons. For example, some of the data is not shown to the user in the signal matrix tool 20 (SMT). This allows the user to choose between the ACT 10 and the SMT 20 when connecting/disconnecting internal functions to/from the real inputs and outputs of the device.

Figure 3:
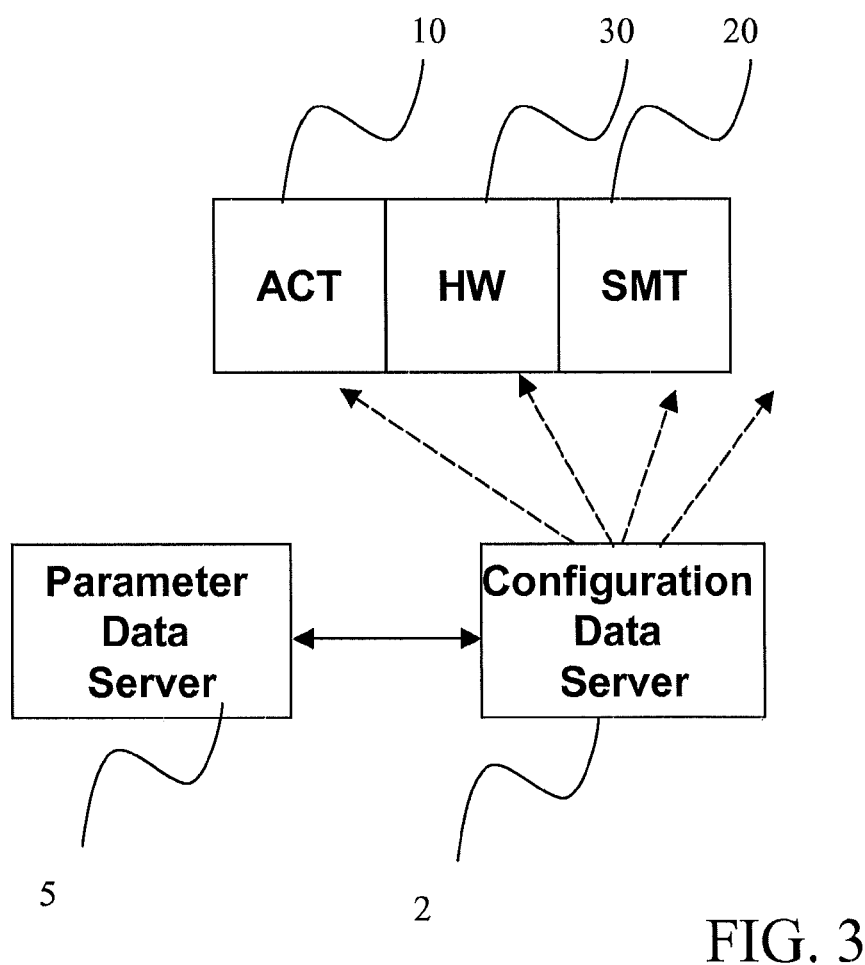
FIG. 3 is a block diagram illustrating an exemplary data server concept of the present disclosure.

FIG. 3 illustrates a data server concept according to an exemplary embodiment of the present disclosure. A configuration data server (CDS) is responsible for the business logic and for combining the type and instance data. One data server can serve one or several tool components with logic and data. For example, according to an exemplary embodiment, the configuration data server 2 is responsible for managing the configuration data for configuration tools such as ACT 10, SMT 20 and HW (hardware) tool 30 (hereinafter "HWtool"). Data servers can also exchange data with each other when needed. The configuration data server 2 can be connected to a second data server, which is a parameter data server 5, for example. According to an exemplary embodiment, the same data should not be stored by more than one data server.

Figure 4:
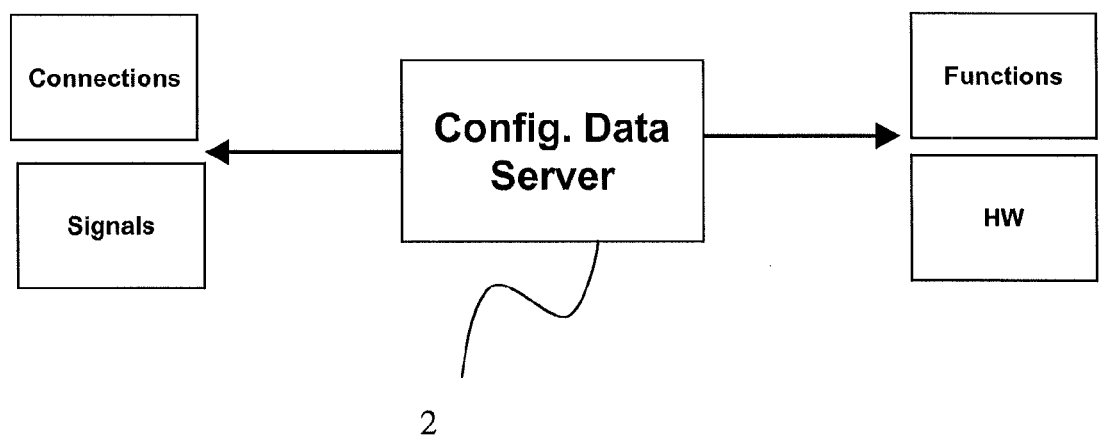
FIG. 4 is a block diagram illustrating data administered by an exemplary configuration data server according to at least one embodiment.

FIG. 4 shows various types of data that can be administered by the configuration data server 2. Configuration data relates to connections, signals, functions and hardware (HW) of the IED, for example. Data administered by the configuration data server 2 is used in configuration tools such as the ACT 10, SMT 20 and HWtool 30. In other words, the ACT 10, SMT 20 and HWtool 30 can update the data in the same server. There can be more than one data server, which store other IED-related data. Instance and type identifiers for connecting data can be stored in every data server. Instance and type identifiers can be used as relation identifiers.

Figure 5:
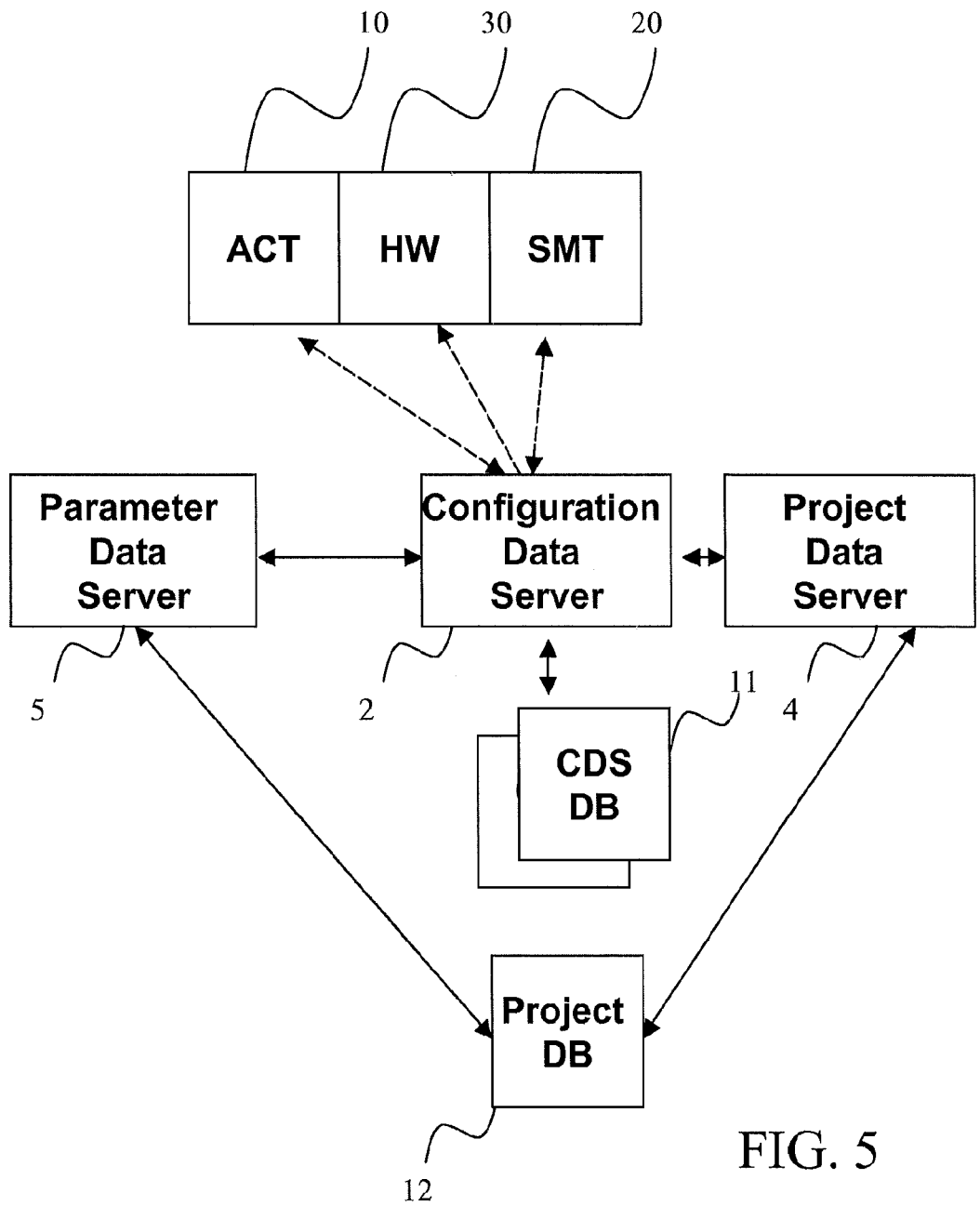
FIG. 5 is a block diagram illustrating data servers and database relationships.

FIG. 5 is a block diagram illustrating an exemplary relationship between data servers and data storage. The configuration data server 2, for the ACT 10, SMT 20 and HW 30, stores data in a configuration data server data storage (CDS DB) 11, which can be a SQL-database (structured query language) or an XML-type data storage, for example. Among other servers shown, the parameter data server 5 and the project data server (PDS) 4 can have a common data storage, such as a project database (Project DB) 12, for example. All data to the ACT 10, SMT 20 and HW 30 can be tunnelled through the configuration data server 2.

Figure 6:
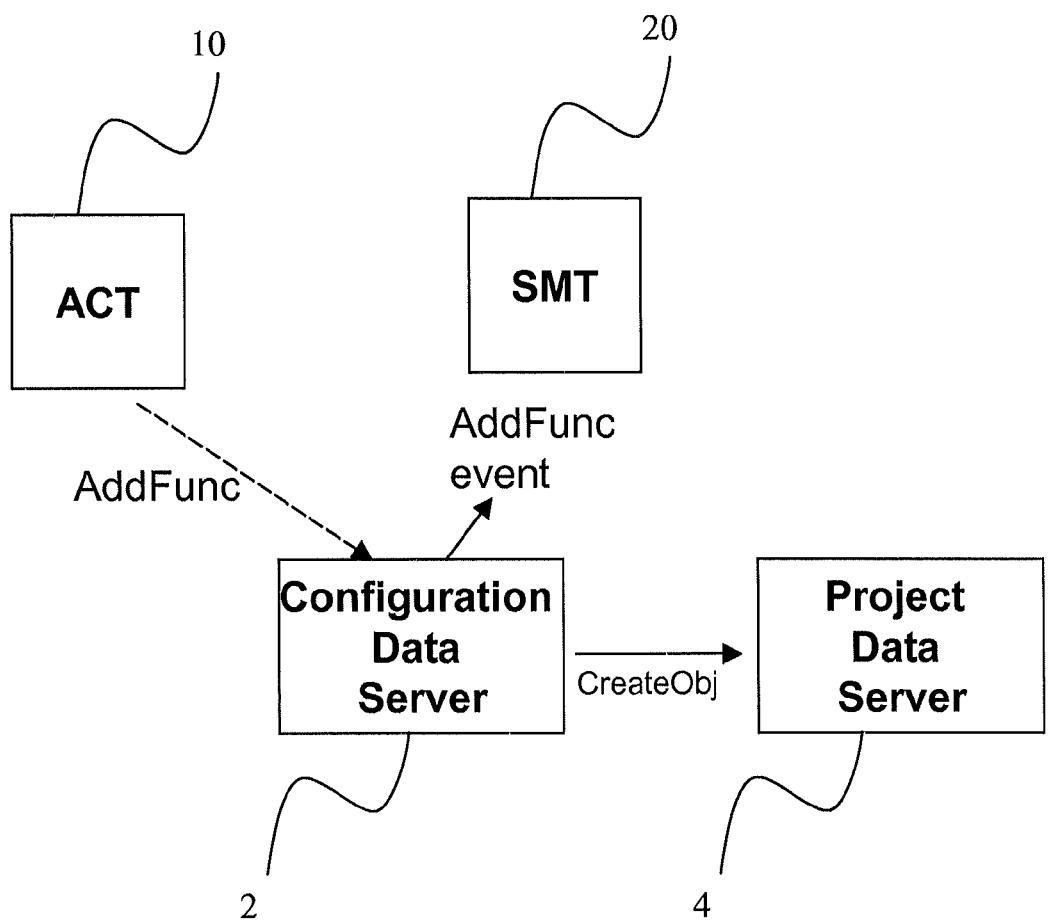
FIG. 6 is an illustrative partial diagram of an exemplary system of the present disclosure.

FIG. 6 is an illustrative partial diagram showing an example in which the user can add a function in the ACT 10. The exemplary system can implement the following features. For example, the ACT 10 can call "CreateFunction" in the CDS 2. In this example, the CDS 2 calls CreateObject in the PDS 4. Open tools (SMT 20) are notified by the CDS 2 that new data exists. Methods providing coexistence of the data are created in the CDS 2 with Object Oriented Programming. CDS 2 has an interface that provides a CDS object model; instance and type data. The interface has a method of checking if the configuration tool has unsaved instance data. One exemplary technique is to register/unregister the configuration tool as a listener of CDS. One possibility is to synchronize all the registered listeners when the configuration tool saves the configuration data. The interface manages one-directional connections from the source object to multiple target objects.

Figure 7:
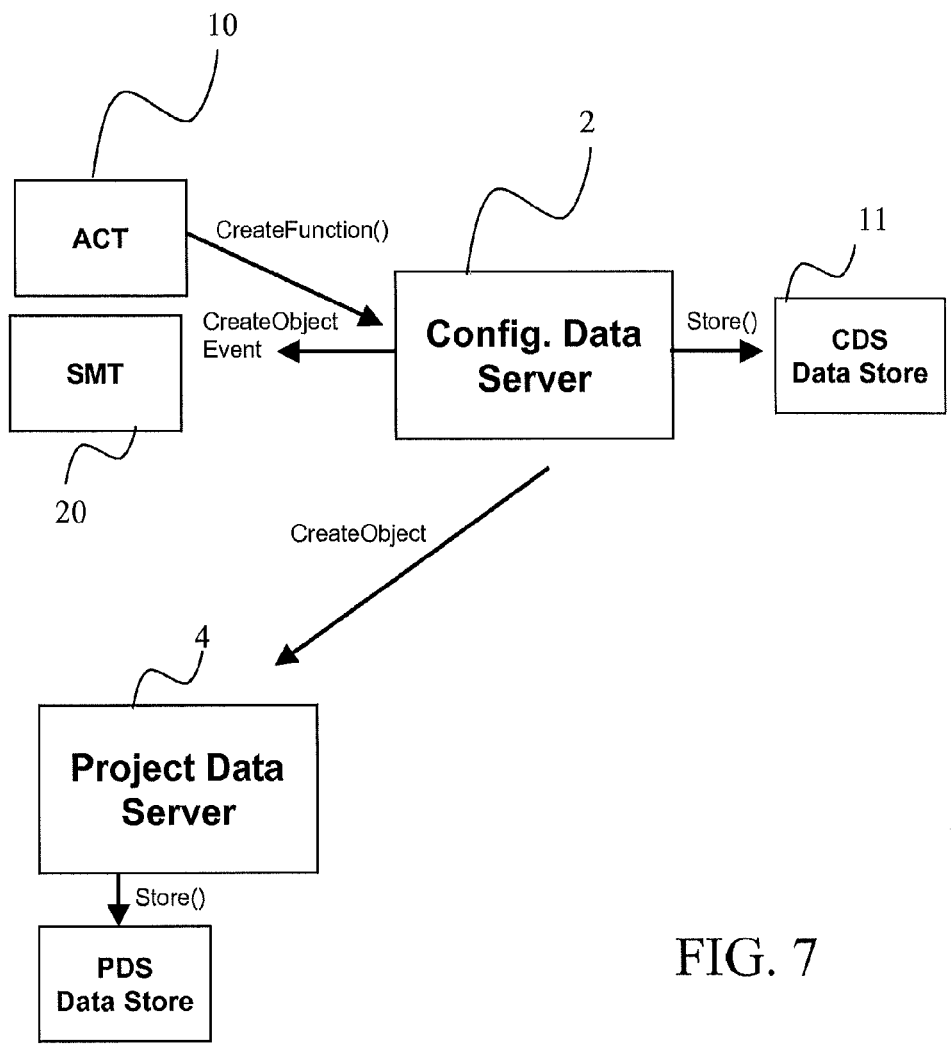
FIG. 7 is a block diagram illustrating an example in which a user adds a function according to an exemplary embodiment of the system.

FIG. 7 is an illustrative diagram showing an example in which the user adds a function in the ACT 10. The system can implement the following features. For example, the ACT 10 calls "CreateFunction" in the CDS 2. The CDS 2 calls CreateObject in the PDS 4. The Open tool (SMT 20) is notified by the CDS 2 that new data exists. Data server(s) (e.g., CDS 2, PDS 4) receive(s) type information on the added function from the type information stored in one of the servers. Relationships between the data stores are handled by the data servers. Other data servers and open tools are notified by firing a CreateObject event. Only CreateObject methods are shown here but the exemplary features are similar in deleting a function (DeleteObject) (the example shown in FIG. 8) and in modifying a function (ModifyObject).

Figure 8:
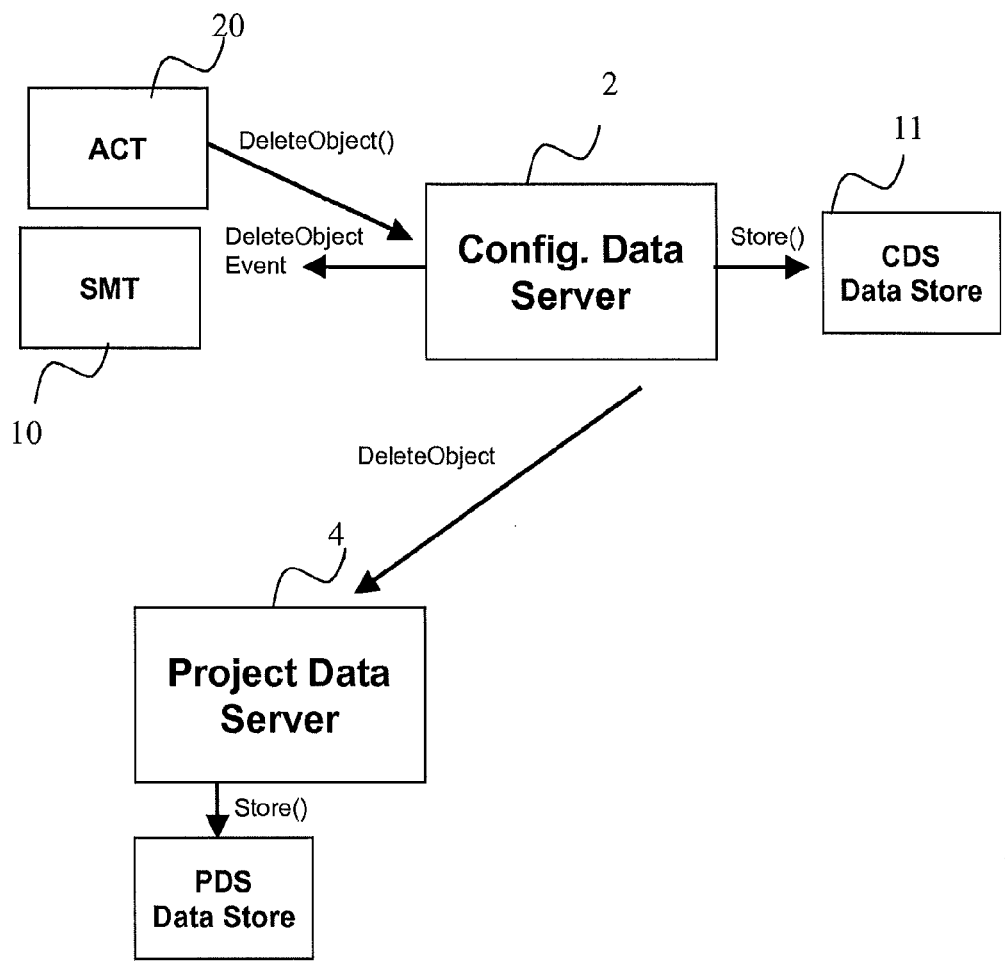
FIG. 8 is an block diagram illustrating an example in which a user deletes a function according to an exemplary embodiment of the system.

FIG. 8 is an illustrative diagram showing an example in which the user deletes a function in the ACT 10. The system can implement the following features. For example, the ACT 10 calls "DeleteObject" in the CDS 2. The CDS 2 calls DeleteObject in the PDS 4. Other open tools (SMT 20) are notified by the CDS 2 that data no longer exists. Other servers remove all references to the deleted object.

Figure 9:
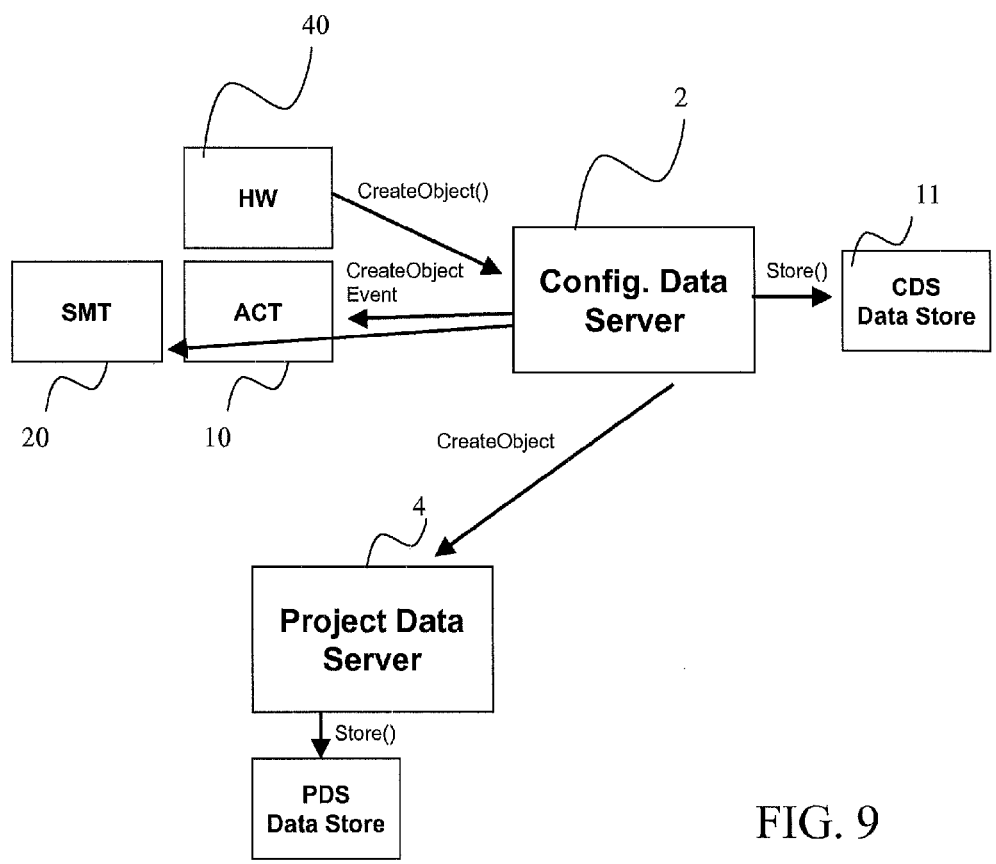
FIG. 9 is a block diagram illustrating an example in which a user adds hardware according to an exemplary embodiment of the system.

FIG. 9 illustrates an exemplary situation in which the user adds a hardware in the HWtool 30. The system can implement the following features. For example, the HWtool 30 calls "CreatObject" in the CDS 2. The CDS 2 calls CreateObject in the PDS 4. The open tools (ACT 10 and SMT 20) are notified by CDS 2 that new data exists. The PDS 4 notifies the PST and the plant structure, which is updated when the user saves the changes.

Although the exemplary embodiments of the present disclosure described with reference to the drawings comprise a computer apparatus having a processor (e.g., CPU) and a process performed in the computer apparatus and the system, the disclosure also extends to computer programs, such as computer programs recorded on a computer-readable recording medium that cause a computing device, when executing the program to be adapted for carrying out the exemplary embodiments of the present disclosure. The program may be in the form of source code, an object code, a code intermediate source, and an object code such as in a partially compiled form, or in any other form suitable for use in implementation of the processes according to the disclosure. The program may be recorded in a computer-readable storage medium, such as a storage medium or a magnetic recording medium.

It will be appreciated that, as the technology advances, the inventive concept of the present disclosure can be implemented in various ways. The disclosure and its embodiments are not limited to the examples described above but may vary within the scope of the claims.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A configuration system of an intelligent electronic device for power transmission and distribution, comprising:
    at least one computing device having a processor configured to execute at least one of a first configuration software tool to provide a first visual representation of configuration data of the intelligent electronic device, and a second configuration software tool to provide a second visual representation of configuration data of the intelligent electronic device;
    a configuration data storage device configured to store the configuration data;
    a configuration data server configured to provide the configuration data to the configuration software tools, the configuration data server being configured to:
    a) receive and forward a change in the configuration data made by the first configuration software tool, and
    b) send a notification to the second configuration software tool with an event call created by the configuration data server to update the second visual representation, and to enable modifications to the configuration data by either one of the configuration software tools using the event call,
        wherein the processor is configured to execute the first configuration tool and the second configuration tool concurrently and automatically update one of the configuration tools when an update is made in the other configuration tool, as each configuration tool uses and modifies identical configuration data stored on the configuration server.

2. A configuration system of an intelligent electronic device according to claim 1, wherein the first configuration software tool is an application configuration tool, and the second configuration software tool is a signal matrix tool.

3. A configuration system of an intelligent electronic device according to claim 1, wherein the configuration data server is configured to send the notification with an event call created by the configuration data server.

4. A configuration system of an intelligent electronic device according to claim 3, wherein the event call updates the visual representation of the configuration data in more than one of the configuration software tools.

5. A configuration system of an intelligent electronic device according to claim 1, wherein the configuration data is located in more than one data storages connected to a communication network through which the at least one computing device, the configuration data server and the data storages are configured to communicate.

6. A configuration system of an intelligent electronic device according to claim 1, wherein the configuration data storage is a database.

7. A configuration system of an intelligent electronic device according to claim 1, wherein the configuration data storage is an XML-file.

8. A method of configuring an intelligent electronic device for power transmission and distribution, comprising:
    in a processor of the intelligent electronic device:
    executing a first configuration software tool providing a first visual
    representation of configuration data of the intelligent electronic device;
    executing a second configuration software tool providing a second visual representation of the configuration data of the intelligent electronic device, wherein the second configuration software tool is executed concurrently with the first configuration software tool; and
    storing the configuration data of the intelligent electronic device on a configuration data server; and
    in the configuration data server:
    changing the stored configuration data based on a change the configuration data received from the first configuration software tool; and
    sending a notification to the second configuration software tool with an event call created by the configuration data server to update the second visual representation, wherein updates made in the first or second configuration tool are automatically made in the second or first configuration tool based on the event call, respectively, as each tool uses and modifies identical configuration data stored on the configuration data server.

9. The method according to claim 8, comprising:
    storing the configuration data is located in more than one data storages connected to a communication network; and
    communicating configuration data between the configuration data server and at least one of the data storages.

* * * * *